United States Patent [19]

Ogawa et al.

[11] Patent Number: 4,856,266
[45] Date of Patent: Aug. 15, 1989

[54] METHOD OF PRODUCING OPTICAL FIBER CABLE

[75] Inventors: Satoshi Ogawa; Yasushi Ito, both of Kanagawa, Japan

[73] Assignee: Sumitomo Electric Industries, Ltd., Osaka, Japan

[21] Appl. No.: 151,992

[22] Filed: Feb. 3, 1988

[30] Foreign Application Priority Data

Feb. 10, 1987 [JP] Japan .................... 62-29444

[51] Int. Cl.$^4$ .................. G02B 6/44; D01H 13/04; D07B 5/00
[52] U.S. Cl. ..................................... 57/9; 57/3; 57/293; 57/352
[58] Field of Search .............. 65/4.3, 29, 2, 4.2, 65/4.21; 57/3, 9, 352; 350/96.23; 264/45.9

[56] References Cited

U.S. PATENT DOCUMENTS

| | | | |
|---|---|---|---|
| 4,195,468 | 4/1980 | King et al. | 57/9 |
| 4,205,899 | 6/1980 | King et al. | 57/9 |
| 4,388,799 | 6/1983 | Vires | 57/352 |
| 4,483,134 | 11/1984 | McKay et al. | 57/9 |
| 4,497,164 | 2/1985 | Dotti et al. | 57/9 |
| 4,587,801 | 5/1986 | Missout et al. | 57/9 |

FOREIGN PATENT DOCUMENTS

| | | | |
|---|---|---|---|
| 171841 | 2/1986 | European Pat. Off. | 65/4.3 |
| 2549241 | 1/1985 | France | 65/4.3 |
| 88408 | 6/1982 | Japan | 65/4.3 |
| 204006 | 11/1984 | Japan | 65/4.3 |
| 241004 | 11/1985 | Japan | 65/4.3 |
| 2114771 | 8/1983 | United Kingdom | 65/4.3 |

*Primary Examiner*—Joye Woodard
*Attorney, Agent, or Firm*—Cushman, Darby & Cushman

[57] ABSTRACT

A plurality of grooves are formed in an outer surface of a spacer. The grooves are formed continuously in the longitudinal direction by a die which surrounds the circumference of the spacer. The grooves extend, in the form of parallel periodically reversing helices along the longitudinal direction of the spacer. The optical fibers are guided into the grooves through guide plates arranged to rotate in a reciprocating motion about the spacer. The position of the grooves is detected and converted into an electric signal. The operation of an actuator for driving the movement of the die and the guide plates is controlled on the basis of the electric signal thereby rotating the plates and the die in synchronism with displacement of said grooves.

2 Claims, 2 Drawing Sheets

METHOD OF PRODUCING OPTICAL FIBER CABLE

BACKGROUND OF THE INVENTION

The present invention relates to a method for producing an optical fiber cable in which optical fibers are respectively disposed in a plurality of grooves formed in the outer surface of a spacer.

A conventional method as disclosed in Japanese Patent Unexamined Publication No. 55-12992 is depicted in FIGS. 4 through 6. Referring to FIG. 4, there is shown a spacer 1 for holding a plurality of optical fibers separately from each other. A plurality of grooves 2 are formed in the outer surface of the spacer 1 circumferentially separately from each other. There are four such grooves depicted in FIG. 4, although the spacer may have more or less. The grooves 2 extend over the whole length of the spacer. Each optical fiber is fit into a respective groove. Each of the grooves extends in the shape of SZ twist, that is, changing direction. The respective changes of direction of the four grooves 2 are made at positions longitudinally in the same cross-section of the spacer 1. Further, the four grooves extend substantially parallel to each other.

FIG. 5 is a diagram of a typical apparatus used for producing an optical fiber cable. The apparatus is provided with an extruding unit 3, a twisting unit 4, and a fitting unit 5. In producing an optical fiber cable, first, a spacer 1 including a tension member 26 therein is supplied into the extruding unit 3 which is provided with a die (not shown). The die has a shape capable of forming grooves 2 in the outer surface of the spacer 1 when the spacer 1 comes out of the extruding unit 3. The twisting unit 4 twists the spacer 1 so that the directions of the grooves 2 are changed when the spacer 1 comes out of the twisting unit 4.

The fitting unit 5 fits optical fibers 7 pulled out from respective reels 6 into the respective grooves 2 of the spacer 1. FIG. 6 shows the fitting unit 5 in detail.

As shown in FIG. 6, two guide plates 8 and 9 are arranged so as to surround the spacer 1. The guide plate 8 has four fixed tubes 10. The forward ends of the respective tubes 10 are arranged so that they may be fitted in the respective grooves 2. The optical fibers 7 pulled out from the respective reels 6 are fit into the respective grooves 2 of the spacer 1 through the two guide plates 9 and 8 and further through the respective tubes 10. When the spacer 1 is continuously longitudinally moved, the tubes 10 move along the paths of the respective grooves 2. Since the tubes 10 are fixedly attached to the guide plates 8, the guide plate 8 performs reciprocating rotation in synchronism with the displacement of the grooves 2 of the spacer 1.

The above apparatus and method, however, has the following problem. Because the guide plate 8 for guiding the optical fibers 7 is connected to the grooves 2 of the spacer 1 through the tubes 10 so that the guide plate 8 rotates in synchronism mechanically with the displacement of the grooves 2 of the spacer 5 where the period of change of directions of the grooves 2 of the spacer 1 is short, the influence of inertia force of the guide plate 8 is large. This inertia causes large side pressure which acts on the respective side surfaces of the grooves 2 of the spacer 1. Therefore, the respective side surfaces of the grooves 2 of the spacer 1 are sometimes damaged.

SUMMARY OF THE INVENTION

It is therefore an object of the present invention to provide a method for producing an optical fiber cable in which damage to the grooves of a spacer is prevented. This objective is accomplished by detecting the position of the grooves on the spacer and the guide plates and rotating the die in synchronism with displacement of the grooves.

Using this method, inertia or the like of the guide plates, etc., does not apply any forces to the grooves of the spacer and, therefore, never injures the grooves of the spacer.

In the method of producing optical fiber cable according to the present invention the position of the grooves on the spacer is detected, and the detected position is converted into an electric signal. An actuator for driving the guide plates and the die is provided which is controlled on the basis of the electric signal so that the die and the guide plates are rotated in synchronism with the displacement of the grooves.

DETAILED DESCRIPTION OF THE PREFERRED EMBODIMENT

Figure 1:
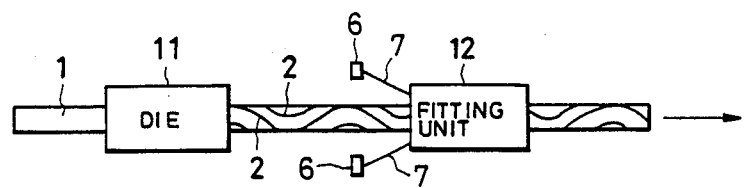
FIG. 1 is a drawing schematically showing an apparatus for carrying out the method according to the present invention.

Referring now to the drawings, wherein like numerals correspond to like parts throughout. As depicted in FIG. 1, a die 11 is arranged so as to surround and rotate in a reciprocating motion about the circumference of a continuously and longitudinally supplied elongated cylindrical spacer 1 to thereby form a plurality of grooves in the outer surface of the spacer in a manner so that each of the grooves extends in the form of parallel periodically reversing helices along the longitudinal direction of the spacer. A fitting unit 12 is provided to fit optical fibers pulled out from optical fiber storing means such as reels 6, into the respective grooves 2 of the spacer 1.

Figure 2:
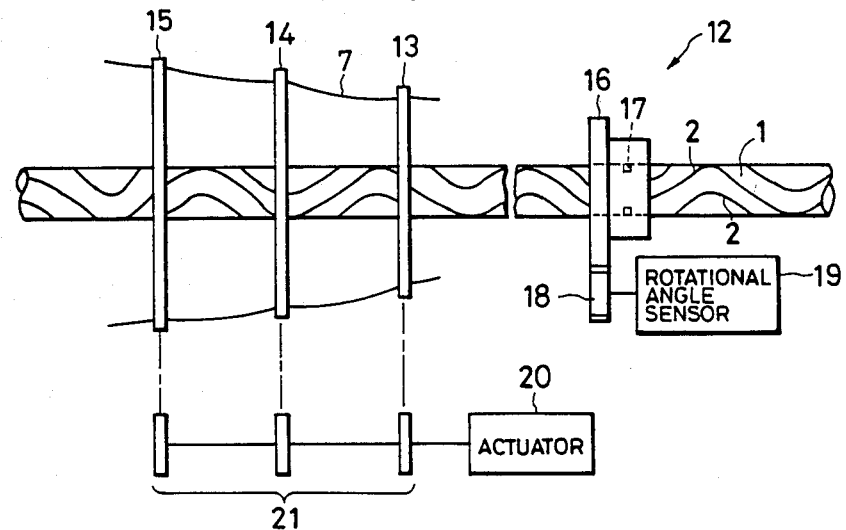
FIG. 2 is a drawing schematically showing the main portion of the fitting unit 12 shown in FIG. 1.
Figure 3:
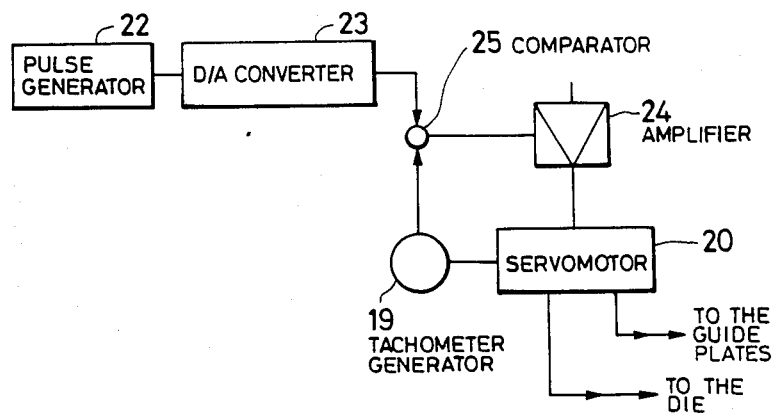
FIG. 3 is a diagram showing a circuit for controlling the operation of an actuator for driving the die and guide plates.
Figure 4:
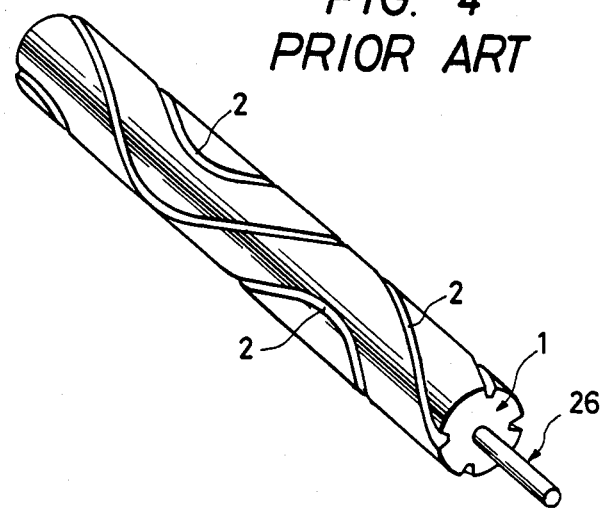
FIG. 4 is a perspective view showing a conventional spacer with grooves formed in its outer surface.
Figure 6:
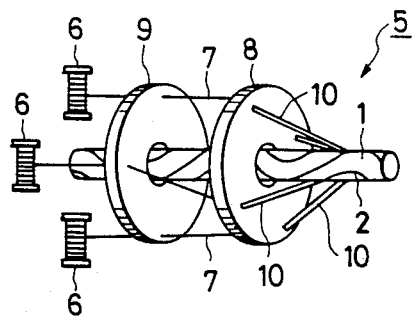
FIG. 6 is a schematic perspective view showing an optical fiber inserting apparatus disclosed in Japanese Patent Unexamined Publication No. 55-12992.

FIG. 2 is a view showing a main portion of the fitting unit 12. As shown, there are provided a plurality of guide plates 13, 14, and 15 which extend radially outwardly about the spacer 1. The guide plates 13, 14 and 15 are arranged to be rotatable about the spacer 1 so as to the guide the optical fibers pulled out from the optical fiber storing means 6 into the respective grooves 2 of the spacer 1. Although the paths of the optical fibers from the guide plate 13 to the grooves 2 of the spacer 1 are not shown in the drawing, such tubes 10 as illustrated in FIG. 6 may be disposed between the guide plate 13 and the grooves 2. The guide plates 13, 14, and 15 are controlled to rotate by an actuator 20 such as a servomotor through transmission belts and pulleys 21. While not shown, the die 11 is also controlled to rotate by an actuator. The die 11 as well as the guide plates 13, 14, and 15 may be controlled to rotate by one and the same actuator 20.

Further, in this embodiment, a detection ring 16 having pins 17 fitted in the respective grooves 2 of the spacer 1 is arranged so as to surround the spacer 1, as shown in FIG. 2. Accordingly, when the spacer 1 moves continuously and longitudinally, the pins 17 move along the paths of the respective grooves 2, so that the detection ring 16 performs a reciprocating rotation in accordance with the displacement of the grooves 2. The rotation of the detection ring 16 is converted into an electric signal by a rotational angle sensor 19 through a gear 18. A tachometer generator, a potentiometer, a pulse encoder, or the like, may be used as the rotational angle sensor 19. Thus, the positions of the grooves 2, specifically, the reversing angle, the pitch of the change of direction, and so on, of the grooves 2 are detected by the rotational angle sensor 19 and converted into an electric signal.

Figure 5:
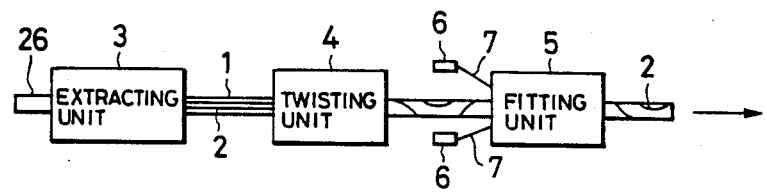
FIG. 5 is a schematic view of an apparatus disclosed in Japanese Patent Unexamined Publication No. 55-12992.

As described above, not only the guide plates 13, 14, and 15, but die 11 are controlled to perform reciprocating rotation by the actuator 20, so that the operation for twisting the spacer becomes unnecessary and therefore the twisting unit 4 of FIG. 5 becomes unnecessary.

FIG. 5 shows an example of the circuit for controlling the operation of the actuator 20 for driving the die 11 as well as the guide plates 13, 14, and 15. A pulse generator 22 generates a predetermined pulse signal so as to control the rotation (including forward and reverse rotation) of the servo motor used as the actuator 20. The pulse signal is converted into an analog signal by a disitallanalus converter 23 and sent to the servo motor 20. The tachometer generator used as the rotational angle sensor 19 detects the position of the grooves of the spacer 1 and converts the detected position into an electric signal. A comparator 25 compares a signal sent from the tachometer generator 19 with a reference signal sent from the pulse generator 22 and a difference between the signals is transmitted to the servomotor 20 after being amplified by an amplifier 24. The thus feedback-controlled servomotor 20 drives the die 11 and the guide plates 13, 14, and 15 so as to be rotated in synchronism with the displacement of the grooves 2.

Accordingly, inertia or the like of the guide plates 13 through 15 never influences the pins 17 fitted in the respective grooves 2 of the spacer 1, and friction between the pins 17 and the respective grooves is low and kept constant.

As described above, according to the present invention, a position of the grooves of the continuously fed spacer is detected, and the detected position is converted into an electric signal so that the operation of the actuator for driving the guide plates and the die is controlled by the electric signal. Accordingly, even if the strength of the grooves is small or the period of turning of the grooves is short, the grooves are never damaged.

What is claimed is:

1. A method of producing an optical fiber cable comprising the steps of:

continuously advancing an elongated cylindrical spacer in a longitudinal direction of the spacer and forming a plurality of continuous grooves in an outer surface of the spacer, said grooves being formed by a die which surrounds and rotates about a circumference of said spacer in a reciprocating motion so that said grooves extend in the form of parallel periodically reversing helices along the longitudinal direction of said spacer;

guiding optical fibers fed out of an optical fiber storing means by a plurality of guide plates into said respective grooves, said guide plates being positioned so as to rotate in reciprocating motion about said spacer;

detecting a rotational displacement position of said grooves of said spacer at a reference point along the longitudinal direction of said spacer and generating an electric position signal indicative thereof; and controlling the operation of an actuator for driving said die and said plurality of guide plates, said actuator driving said guide plates and said die on the basis of said position signal so that said die and said guide plates rotate in synchronism with displacement of said grooves.

2. A method of producing an optical fiber cable according to claim 1, wherein said step of detecting a position of said grooves comprises the step of sensing a rotational angle of a rotatable detection ring arranged so as to surround said spacer, said detection ring having pins which are disposed in and follow the displacement of said respective grooves of said spacer so that said electric position signal is indicative of said rotational displacement position.

* * * * *